United States Patent [19]

Giddey et al.

[11] Patent Number: 4,623,551
[45] Date of Patent: Nov. 18, 1986

[54] METHOD FOR THE FABRICATION OF A CHEESE FOAM

[75] Inventors: Claude Giddey, Geneva; Georges Dové, Carouge, both of Switzerland

[73] Assignee: Battelle Memorial Institute, Geneva, Switzerland

[21] Appl. No.: 753,996

[22] Filed: Jul. 11, 1985

[30] Foreign Application Priority Data

Jul. 17, 1984 [CH] Switzerland ............... 3465/84

[51] Int. Cl.$^4$ ............... A23C 19/09; A23C 19/093
[52] U.S. Cl. ............... 426/564; 426/568; 426/582; 426/613; 426/479
[58] Field of Search ............... 426/582, 569, 564, 613, 426/568, 479

[56] References Cited

U.S. PATENT DOCUMENTS

| 3,067,037 | 12/1962 | Herald et al. | 426/582 |
| 3,962,483 | 6/1976 | Schulz | 426/582 |
| 3,985,902 | 10/1976 | Coste | 426/582 |

FOREIGN PATENT DOCUMENTS

| 0002372 | 1/1979 | Japan | 426/582 |
| 0001455 | 1/1984 | Japan | 426/582 |

*Primary Examiner*—Jeanette Hunter
*Attorney, Agent, or Firm*—Cushman, Darby & Cushman

[57] ABSTRACT

Cheese is melted under heating and an emulsion of air or a non toxic gas in an aqueous albumin solution is incorporated therein, by providing a laminar and non-turbulent mixing under heating.

6 Claims, No Drawings

METHOD FOR THE FABRICATION OF A CHEESE FOAM

The present invention has for its object the preparation of an aerated food product based on cheese or, more specifically, based on milk products having been subjected to a ripening treatment similar to which the cheeses are subjected to.

The product prepared according to the invention possesses a stable and cohesive foam structure provided by air or gas microbubbles dispersed within the cheese dough and, for this reason, it will be called hereunder "cheese foam" or "foamed cheese".

The concept of cheese foam is not new per se. Indeed, French Pat. No. 2,165,202 discloses a cheese foam obtained by adding to processed cheese melted at 95°–110° C. under an inert atmosphere one or more of the following ingredients: milk powder, cream, butter, caseine, whey, and beating the mixture under a gas pressure of 0.5 to 1.5 bar so as to obtain a foam with a foaming coefficient of 1.2.

The following document Dissertation Abstracts International; Section B, the Sciences & Engineering 32 (6), 3424 (1971) mentions a cheese beaten in the form of a foam and the fact that the collapse of this foam under storage decreases when the emulsion is effected in the presence of $N_2O$ and that it contains emulsifiers and stabilizers such as gum acacia and glucosyl-glucanes.

French Pat. No. 2,133,293 discloses an expanded milk product obtained by beating milk in the cold and containing rennet so as to obtain a foam of density 0.25 to 0.55. The milk can be condensed milk and it can be innoculated with a microorganism of the penicillin type so as to obtain cheese.

The cheese foams known in the state of the art have however a texture which is not very strong and which is not very stable to storage for a long period and it was desirable to remedy these drawbacks by providing a cheese foam of stronger consistency, stable under storage and of extended conservation.

The cheese foam obtained according to the invention, although it is soft and can spread easily, posesses a great stability to storage (more than six months at room temperature in a closed vessel which is however opened from time to time to remove samples) in terms of volume, foam density and storage properties. This foam contains substantially cheese, a certain proportion of water and, incorporated therein in a perfectly homogeneous way, an air or gas emulsion of an albumin solution, such emulsion being namely constituted by beaten egg-white. Its density is of the order of 0.65 to 0.80 g/cm$^3$. The proportion of gas/albumin emulsion relative to the cheese is about 0.5 to 2 v/v which corresponds, if one uses as a starting a solution 10 to 20% by weight of albumin in water, to the incorporation into the cheese of 1 to 5% by weight of this solution, the volume of the latter increasing 10 to 20 times under beating. Roughly, the quantity by weight of albumin incorporated, as the emulsion into the cheese, does not exceed about 0.2 to 1% of the total which, in terms of food and flavour, should at first sight lead to negligible effects.

Now, and it is there that an expected interest of the invention resides, the cheese foam obtained according to the invention posesses a taste and a structure extremely attractive compared to the starting cheese used to produced it. It is onctuous, light, of very fine taste and can be easily spread over bread, this being without the addition of any further fatty material. Besides, it has in terms of organoleptic properties, very little relationship with reqular processed cheese, the flavour of which is generally vulgar and ill developed whereas, in the product of the invention, the natural cheese flavour of the original cheese is preserved and even further developed. Besides, the texture of the cheese foam is significantly more attractive by its softness than that of the usual processed cheeses.

The process to achieve the present cheese foam is summarized in claim 1.

It is particularly important, when the beaten white egg b is incorporated into the cheese solution a, due to the great difference of densities between componants a and b, to avoid any exagerated mechanical stress which might modify the aerated structure of the desired foam, and, for instance, any violent kneading effort which might lead to a break of the gas/liquid emulsion constituted by the air or gas bubbles dispersion in the albumin solution. In order to do that, it is possible, when a small amount of foam is produced (laboratory experiments), to work manually by means of conventional tools, wooden or metal spoons, spindle mixer, etc.. In this respect, it will be noted that document U.S. Pat. No. 3,962,483 teaches the incorporation under heat to molten cheese of proteins such as caseine and albumin, the object of such incorporation being to impart to the cheese more resistance to melting. Now, it was noticed that such incorporation, followed by beating the product which results therefrom in order to provide a foam, this being as in the teaching of document FR-A-2,165,202, does not lead to a cheese foam such as that of the invention. Indeed, under such conditions of prior mixing with molten cheese, the albumin does not provide per se a foam, this property being inhibited by the presence of the fatty substances of the cheese; then beating only leads to an unstable transitory light condition resulting from the incorporation of air into the mass, this air escaping shortly afterwards.

Regarding now the industrial working of the method of the invention, the process summarized in claim 5 will be preferably used. In order to implement this "static mixing process", it is possible to use a tubular device in which the components to be mixed are circulated, this device comprising, successively, dividing elements, deflecting elements, some being left-handed and the others being right-handed, and linearly mixing elements. One example of such a apparatus is found in the reference Food Engineering 42 (11), 119-20 (1970).

The types of cheese usable in the present invention are extremely many and include practically all the cheeses susceptible to form cheese aqueous suspension under heating with or without the incorporation of additional water. Thus, the following soft dough cheeses are suitable like camembert, brie, etc.., the blue cheeses like roquefort, gorgonzola, bresse, etc.. and the harder cheeses such as tilsit, gruyère, comté, appenzeller, etc.. With the cheeses having a highly peptized dough such as roquefort, the suspension can be obtained without additional water, the aqueous suspension being obtainable to a desired consistency by a simple heating of the dough under mechanical agitation. For other dryer cheeses, addition of water, of the order of 5 to 50% by weight, can be necessary, the exact amount depending on the kind of cheese, on its degree of dryness and on the kind of foam to be obtained. The quantities of water possibly necessary to be added have to be determined from case to case according to the needs. Generally speaking, the solution is prepared by cutting the cheese (into pieces or into chips), by mixing it with the water and by heating the mixture until it dissolves. To improve the melting, it is possible to use melting salts, for instance phosphates, polyphosphates, acetates, lactates, etc..

It is important to use sufficiently ripened cheeses in order that the enzymatic action of the innoculated microorganisms has achieved a level of protein peptization sufficient to ensure solubility in water and to enable the obtention of a homogeneous aqueous solution. Thus, for industrial needs, it can be advantageous not to use fully ripened commercial cheeses (indeed, in the industrial processes, the requirement to have a relatively large quantity of starting material of rigorously identical properties is important) but to proceed with milk curds (prepared by usual processes) taken as in bulk, for instance of several tens or hundreths of kilogrammes. In such case, this mass of curds in innoculated, before or after its precipitation, with one or several typical microorganisms selected according to the needs and the kind of cheese which it is desired to convert into foam (including rennet) and the ripening of the full mass is effected under well controlled conditions, sheltered from the air and with periodical mixing. Once the desired degree of ripening is obtained, it will be possible to use this mass in part or as a whole in the process according to the invention.

To achieve the gas emulsion in the albumin solution (egg white), it is possible to use fresh egg-white or powdered egg-white; in general, it is preferred to use the white in the form of a dried powder for reasons of commodity and of reproducibility (more accurate weighing). The beating of the solution into a snow can be effected by all the known usual means including continuous or discontinuous methods. In place of air, it is possible to use a non toxic gas, for instance a rare gas, $N_2$, $N_2O$, etc.

The temperature at which the incorporation of the emulsion b to the cheese solution a is effected has the following importance: it should be sufficiently high for, on one hand, ensure that the solution of cheese be of the required fluidity and, on the other hand, enable the albumin to solidify (the solidification is also, partly, provided by the cheese acidity: pH 5–6) and also impart to the foam of the invention its remarkably cohesive, although flexible, structure. If the temperature is too high, that is if it markedly exceeds 70° to 80° C., the "setting" could be too rapid and could lead to some lack of homogeneity of the product. Conversely, too low a temperature, i.e. markedly below 40° C., could exagerately delay the "setting" and might result in a more or less pronounced collapse of the foam.

It is well understood that, in addition to the usual components of the cheeses which have been already disclosed above, that is to say, in addition to the milk proteins, the fatty substances, and water, the microorganisms, salt and other natural additives of cheeses, it is also possible to use additional food additives such as spices, various seasoning agents, plant extracts and even other foodstuffs under comminuted form such as ham, meat, vegetables, etc..

It is also possible to incorporate stabilizers such as gelatin, agar, carrageenane, and other stabilizing polysaccharides.

The following examples illustrate the invention.

EXAMPLE 1

The following ingredients were heated under agitation, first to 115° C. during about 15 min, then to 60° C., so as to achieve a suspension a:

355 g of blue d'Auvergne with 55% of fat, 50 g of water and 7 g of PZO (melting salt of the Benckiser Knapsack company, Germany). Besides, a emulsion b was prepared by vigorously beating at room temperature under air a solution of 1.67 g of powdered albumin in 8.33 g of water.

Thereafter the emulsion b was slowly incorporated with a spatula to the suspension a maintained at 60° C. Any violent move was avoided which might lead to a break of the emulsion. The mixture was homogenous after about 3 to 5 min of work and provided a foam of density 0.75 having the following composition by weight: cheese 83.75%, water 14.15%, albumin 0.4% and melting salt 1.7%.

This foam has a very fine although intensed taste and reminds of a mixture of blue d'Auvergne and butter. Its consistency is cohesive and soft at the same time and it can spread into very fine homogeneous layers. Its storage stability in jars is excellent and exceeds 6 months at room temperature with no particular precaution.

EXAMPLE 2

There was proceeded as in the previous example starting from 204 g of 90° C. pasteurized gorgonzola, 30 g of water, 2 g of PZO and 0.6 g of gelatin as stabilizer. On the other hand, there was also prepared an emulsion of 1.34 g of albumin in 6.66 g of water and this emulsion was incorporated at 60° C. into the solution of gorgonzola, which provided a cohesive, flexible foam of excellent taste.

EXAMPLE 3

There was proceeded as in the previous examples starting with, on one hand, 3.1 kg of tilsit, one liter of water, 100 g of PZO and 6 g of gelatin and, on the other hand, 16 g of albumin in 83.3 ml of water and beating into an emulsion.

These components were mixed together by bringing them, under the form of streams driven by pumps, into a static mixing tube heated to 60° C. and comporting a succession of deflecting baffles and mixing elements arranged so as to, alternatively, put the streams laminarly together, divide them, subject them to a helical displacement and bring them together again. The number of these mixing elements was equal or exceeded 12. There was thus obtained, at the output of the tube, a homogenized mass of tilsit foam which was at the same time cohesive and flexible and of excellent taste. This foam remained in perfect condition for more than 6 months at ordinary temperature.

EXAMPLE 4

Cheese kinds labelled A to D were heated to 90° C. under kneading until a fluid and homogeneous mass was obtained using the following ingredients gathered (by weight) in the Table hereunder.

A: emmenthal; B: camembert; C: fontine; D: roquefort.

Besides, there were prepared albumin solutions in water (also according to the indications given in the Table hereunder) and these solutions were converted by vigorous beating in the presence of air into snowy emulsions (densities of the order of 0.03 to 0.1).

Thereafter, the respective albumin foams were incorporated to the creams A to D around 50° to 60° by using the mixing technique disclosed in Example 1.

TABLE

| Ingredients (p.b.w.) | A | B | C | D |
| --- | --- | --- | --- | --- |
| Cheese | 500 | 500 | 600 | 477 |
| Anhydrous butter | 125 | 20 | — | — |
| Water | 400 | — | — | — |
| PZO (melting salt) | 20 | 3 | 12 | — |
| AFILACTS (preserving agent) | — | 0.01 | 0.01 | — |
| K sorbate | 1.6 | — | — | 1.7 |
| Fondagil M-9 (melting salt) | — | — | — | 7.1 |
| Gelatine | — | — | — | 1.55 |
| Fresh cream at 25% | — | — | 400 | — |
| Albumin at 16% | 35 | 30 | 36 | 14.3 |
| Cheese foam density | 0.75 | 0.8 | 0.75 | 0.7 |

There were thus obtained very appetizing cheese foams having a very fine taste and excellent stability under storage.

We claim:

1. A method for fabricating a cheese foam from pasteurized or sterilized cheese, wherein the foam has an aerated cohesive structure of long storage stability, constituted by the presence of air or gas micro-bubbles homogeneously dispersed therein, comprising the steps of:
   (a) preparing an aqueous solution or suspension of cheese dough which has a temperature between 40° and 80° C., and a viscosity in said temperature range of 500 to 50000 cP;
   (b) preparing an emulsion of air or non-toxic gas at room temperature by beating the gas into an aqueous 10 to 20% by weight albumin solution so as to achieve a gas/liquid emulsion of the order of 10/1 to 20/1 v/v; and
   (c) adding 0.5 to 2 volumes of the emulsion obtained in (b) to 1 volume of the aqueous solution of cheese dough prepared in (a), at a temperature between 40° and 8020 C., and imparting thereto laminar non-turbulent movement such that the components unite progressively together into a homogeneous mixture, the structure of which stabilizes itself by coagulation of the albumin.

2. Method according to claim 1 wherein the solution or suspension of cheese dough is obtained by heating cheese until it is liquified, the water of the solution or suspension being that contained in the cheese.

3. Method according to claim 1, wherein the solution or suspension of cheese dough is obtained by dispersing cheese in comminuted form into 5 to 50% of its weight, of water and heating until complete dissolution occurs with homogeneous suspension formation.

4. Method according to claim 1, wherein the solution or suspension of cheese dough is obtained from milk curd by first innoculating the curd with at least one strain of microorganisms and rennet appropriate to convert the curd into cheese;
   ripening the resulting mass under shelter from air and while periodically agitating,
   then heating the mass after the ripening is complete until it is fully melted.

5. Method according to claim 1, wherein step (c) is carried out by forming
   a first stream (a) of the solution or suspension and a second stream (b) of the emulsion,
   placing these two streams side-by-side so that they flow linearly in the same direction such as to achieve a single flow (ab) with the two adjoining components a and b juxtaposed;
   dividing this flow, approximately transversely to the junction area of the two components, into two independent streams $(ab)_1$ and $(ab)_2$, each of which comprises a portion of component (a) and a portion of component (b);
   modifying the shape and the orientation of the streams relative to each other by interposing a helical baffler in the path of the streams and again bringing the streams together laminarly into a single flow, the modification imposed by the baffles leading essentially to the contacting of the component b of $(ab)_1$ with component b of $(ab)_2$, and conversely, so to achieve an approximately tetraphase stream $abab = (ab)^2$; and
   repeating the splitting, reorienting and juxtapositioning of the streams until a composite stream, macroscopically homogeneous, $abab \ldots ab = (ab)^n$ is obtained, n not being lower than 12.

6. Cheese foam consisting essentially of, by weight, 30 to 50% of cheese solids, 1 to 4% of a salt, 0.2 to 5% of egg albumin, the balance being water and optionally seasoning agents or other comminuted foodstuff, said foam comprising a cheese dough having a homogeneous dispersion of air or gas microbubbles in the cheese dough, said foam further having a density of 0.65 to 0.80, and a taste which is essentially the same as that of the source of the cheese solids used for its manufacture but with a finer and softer quality.

* * * * *

UNITED STATES PATENT AND TRADEMARK OFFICE
CERTIFICATE OF CORRECTION

PATENT NO. : 4,623,551

DATED : November 18, 1986

INVENTOR(S) : Giddey et al

It is certified that error appears in the above—identified patent and that said Letters Patent is hereby corrected as shown below:

Claim 1, at column 5, line 39, delete "8020 C." and insert --80° C.--.

Signed and Sealed this

Seventh Day of April, 1987

Attest:

DONALD J. QUIGG

*Attesting Officer*   *Commissioner of Patents and Trademarks*